United States Patent [19]

Keck

[11] 4,284,500
[45] Aug. 18, 1981

[54] IN-LINE PRESSURIZED WET SCREENING APPARATUS

[75] Inventor: David R. Keck, Seabrook, Tex.

[73] Assignee: Tenneco Chemicals, Inc., Saddle Brook, N.J.

[21] Appl. No.: 113,258

[22] Filed: Jan. 18, 1980

[51] Int. Cl.$^3$ .......................... B07B 1/18; B07B 1/50
[52] U.S. Cl. .................................. 209/250; 209/305; 209/380; 210/411; 210/497.01
[58] Field of Search ............. 209/250, 273, 300, 305, 209/306, 380; 210/411, 436, 457, 456, 412, 414, 415

[56] References Cited

U.S. PATENT DOCUMENTS

| | | | |
|---|---|---|---|
| 1,743,953 | 1/1930 | Beatty | 209/380 X |
| 2,747,741 | 5/1956 | Jacobson | 210/411 X |
| 2,835,390 | 5/1958 | King | 210/414 X |
| 3,311,235 | 3/1967 | Ahlfors et al. | 209/380 X |
| 3,511,374 | 5/1970 | Beal | 209/273 X |
| 4,082,057 | 4/1978 | Hayes | 134/168 R X |

FOREIGN PATENT DOCUMENTS 413677  7/1934  United Kingdom ..................... 210/167

*Primary Examiner*—Ralph J. Hill
*Attorney, Agent, or Firm*—Thomas E. Spath

[57] ABSTRACT

An in-line apparatus for separating oversize particles from a pressurized fluid slurry which comprises:

a rigid, hollow body member capable of withstanding the pressure of the fluid slurry, the body member having a valved slurry inlet port and a slurry outlet port, each port adapted to mate with slurry conduit means;

a washer access port opposite from and in axial alignment with the slurry outlet port;

a hollow, open-ended screen assembly fixedly mounted within the body member between and in axial alignment with the slurry outlet port and the washer access port;

a valved oversize particle discharge port at the lowermost end of the body member adapted to mate with oversize particle conduit means; and retractable backwasher means externally mounted on the body member in axial alignment with the washer access port and the screen assembly, where the backwasher means comprises a fluid discharging spray head adapted to pass axially through the interior of the screen assembly, whereby a pressurized backwashing fluid is directed against the entire interior surface of the screen assembly to dislodge and wash out accumulated oversize particles, and then retract so that the spray head is withdrawn through the washer access port.

9 Claims, 5 Drawing Figures

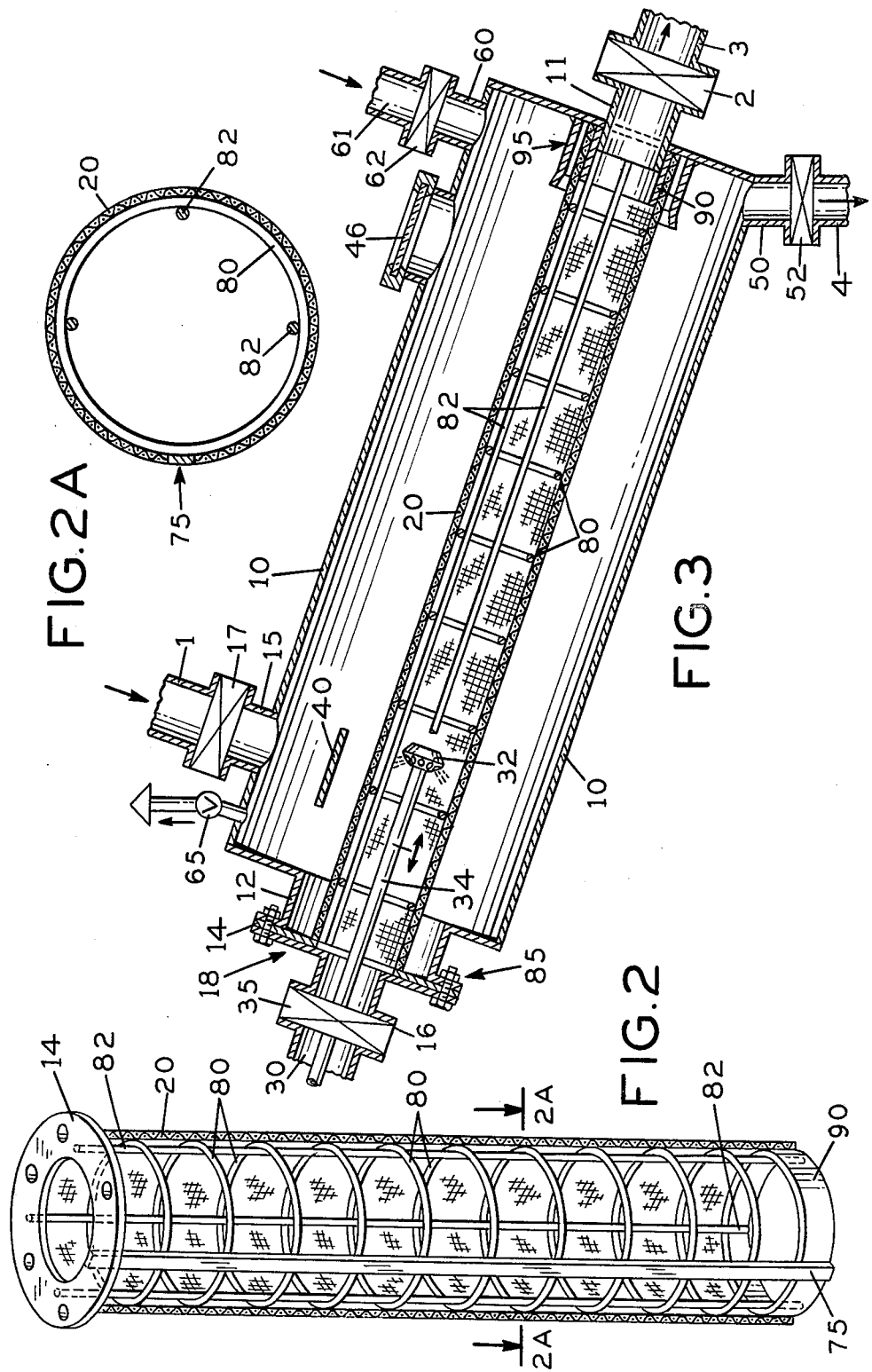

IN-LINE PRESSURIZED WET SCREENING APPARATUS

FIELD OF THE INVENTION

This invention relates to an in-line pressurized wet screening apparatus. More specifically, the invention relates to methods and apparatus which accomplish such wet screening and permit cleaning of the filter medium while the system remains closed and sealed from the environment, thereby eliminating exposure of operating personnel to the potentially hazardous atmosphere contained within the system. This invention is especially adapted for pressurized wet screening of slurries in the commercial production of polyvinyl chloride, or PVC, where personnel exposure to the vinyl chloride monomer, or VCM, must be minimized, and leakage of VCM into the atmosphere due to equipment failures are to be eliminated.

BACKGROUND OF THE INVENTION

Many chemical polymerization processes are conducted in the presence of water or other fluids and the polymer or resin produced is suspended in the fluid. These processes are referred to as suspension processes. Other processes in which particle sizes are reduced by grinding in the presence of water or other fluids also produce suspensions of solid particles in a fluid. In both of these types of suspension processes, there are produced some oversized particles, or agglomerations of particles, which are larger than desired and which must be separated and removed. When a suspension or a slurry (a suspension of solid particles in a liquid) is passed over a relatively coarse filter medium such that the oversized particles or agglomerations of particles are retained by the filter medium while the remainder passes through with the fluid in the form of a suspension, the filtration process is known as wet screening. Wet screening, or separation of these oversize particles, or agglomerates of particles, has been accomplished heretofore by various means. One device commonly used in the PVC industry is a vibrating wet screen separator. This type of device contains a horizontal circular or rectangular screen which can be up to 6 feet in diameter, or of a larger rectangular area, contained within a housing. The screen is vibrated at a high frequency by an electric motor-mounted eccentric weight. The slurry is fed through a port in the top of the housing and onto the screener; acceptably sized PVC particles and water pass through the screen, or filtering medium, while oversize and agglomerated particles are retained on the upper surface of the screen and are moved by the vibrating action to its periphery where they are withdrawn from the side of the housing. All piping connections to and from this screener must be made with flexible connections to accommodate the vibration. In addition, the device can only be mounted with the screen in a horizontal, or nearly horizontal, position and so that the slurry is admitted at the top and withdrawn from the bottom of the housing. In addition to being relatively expensive to purchase and operate, this type of prior art screening device has three deficiencies: periodic failure of the flexible connections can result in substantial emissions of VCM to the atmosphere; the metal body and housing of the screener are subject to fatigue failure which results in VCM emissions; and, due to the light construction required to allow vibration, the screener bodies are incapable of withstanding fluid pressures of greater than about 1 psig.

Other prior art devices, such as box and cone filters, require elaborate procedures to prepare the device for clean-out so as to reduce VCM levels. Washing or manual removal of the screen or other filter medium, an unpleasant and often hazardous task, is required to remove separated and entrapped oversize or agglomerated particles.

SUMMARY OF THE INVENTION

It is an object of this invention to provide an improved in-line wet screening apparatus to separate and remove oversize and agglomerated particles which has the capacity for handling large volumes of a slurry.

Another object of this invention is to provide an in-line wet screening apparatus which will eliminate the emission of hazardous materials, such as VCM, that are contained in the slurry stream being screened.

Another object of this invention is to provide a screening apparatus capable of operating at the line pressure requirements of the system in which it is employed.

Yet another object of this invention is to provide a filtering device which can be quickly backwashed without disassembly, is sealed from the atmosphere and which is self-cleaning to eliminate the need for personnel to manually clean the filter element.

One other important object is to provide a filtering device in which all liquid, solid and gaseous materials are maintained in a closed system, isolated from the surrounding environment, and can be treated prior to discharge to render them neutral or environmentally acceptable.

These objects are obtained by the apparatus of this invention which comprises a rigid, hollow body member capable of withstanding the pressure of the fluid slurry; a valved slurry inlet port and a slurry outlet port, each adapted to mate with slurry conduit means; a screen assembly both ends of which are open, rigidly mounted inside the body member and in axial alignment with the slurry outlet port; a washer access port in the end of the body member opposite and axially aligned with the slurry outlet port; a valved oversize particle discharge port at the lowermost end of the body member adapted to mate with oversize particle conduit means; and backwasher means externally mounted on the body member, and in axial alignment with the washer access port and the screen assembly, where the backwasher means comprises a fluid discharging spray head adapted to pass axially through the interior of the screen assembly whereby a pressurized backwashing fluid is directed against the entire interior surface of the screen assembly to dislodge and wash out accumulated oversize particles.

No vibration of the screener is necessary, so that fatigue failures are eliminated. Since flexible connections are not needed, all piping connections can be screwed or bolted to the apparatus.

The screener body is designed to withstand the same pressure as the up- and downstream slurry conduits. In addition, utilizing a cylindrically shaped filter assembly, the screener of this invention is designed to operate with a higher pressure drop than was possible with the prior art wet screens. Thus, the device of this invention can be made to withstand upwards of 150 psig, or more.

According to one preferred embodiment of the invention, the externally mounted backwasher means are retractable, and the fluid discharging spray head is withdrawn through the washer access port. The fluid discharging spray head passes concentrically through the hollow screen assembly when cleaning and washout are required thereby permitting the filter screen to be cleaned without opening the system to the atmosphere or exposing personnel to the material in the system. The oversize particles can be flushed out and collected, along with the washing fluid, and subjected to further processing.

Further objects and advantages will become apparent from the detailed description of the invention which follows.

DETAILED DESCRIPTION OF THE INVENTION

The invention is more completely described with reference to the following figures in which like numerals are used to identify like elements in the construction.

FIG. 2 is a perspective view of one embodiment of a filter medium and its supporting structure which comprise the screen assembly of the invention.

FIG. 2A is a cross-sectional view taken along line A—A of FIG. 2.

FIG. 3 is a schematic representation of another embodiment of the in-line pressurized wet screening apparatus of my invention mounted for operation at an angle displaced from the horizontal.

Figures 1, 1A:
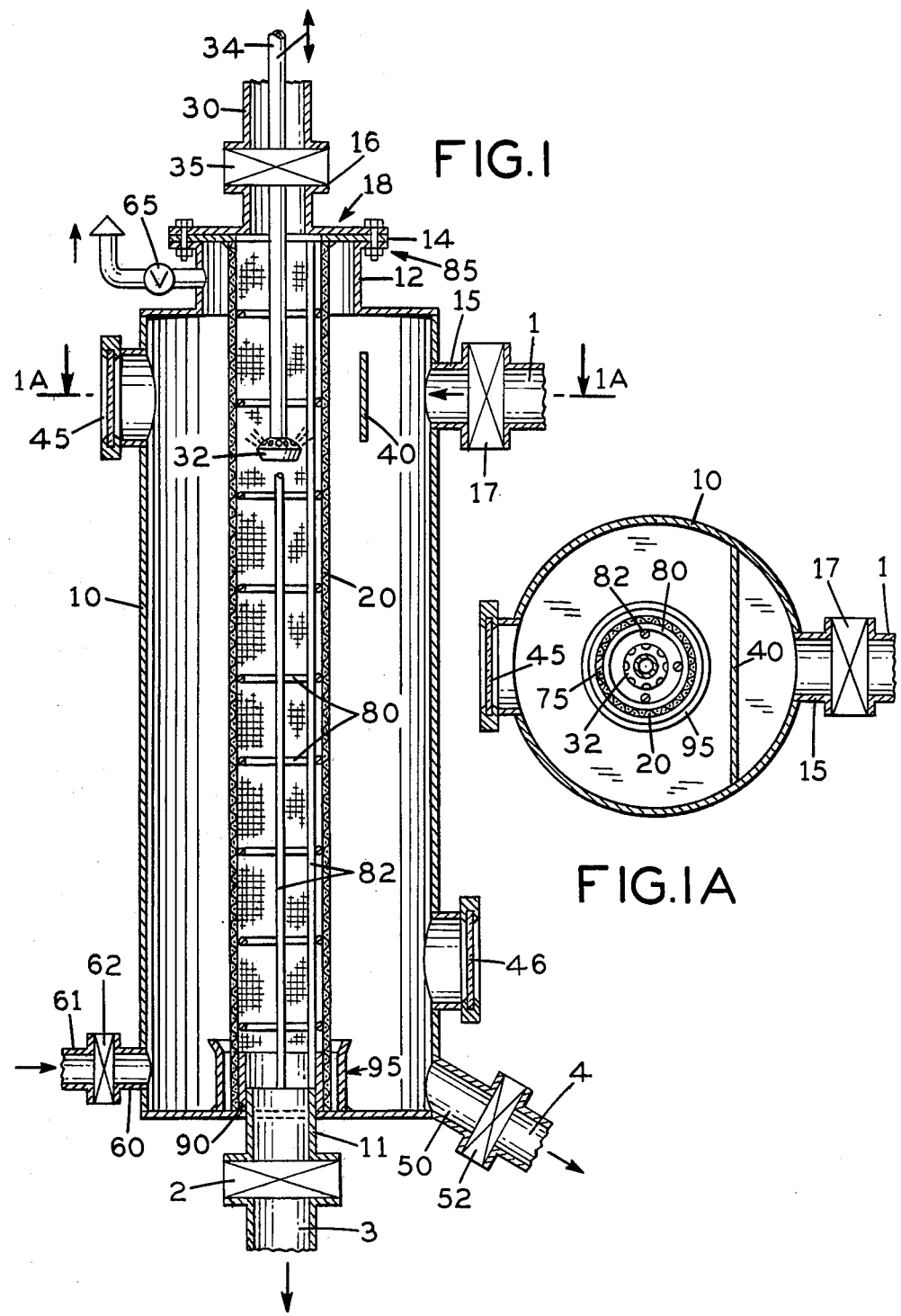
FIG. 1 is a schematic view of an embodiment of the in-line pressurized wet screening apparatus of my invention mounted for vertical operation.
FIG. 1A is a cross-sectional view taken along line A—A of FIG. 1.

In the schematic diagram of FIG. 1 there is shown a rigid, hollow screener body member 10, having a flanged slurry inlet port 15 for admitting slurry into the screener device and associated valve means 17 to control the rate of slurry admission from upstream slurry conduit 1. Screener body 10 has at one end flanged slurry outlet port 11 from which the screened slurry is discharged through outlet valve 2 to downstream slurry conduit 3. In addition, the body is equipped with an oversize particle outlet port 50 and associated valve means 52 for discharging oversize and agglomerated particles. Oversize particles conduit 4 carries oversize particles from the screener body to collection means (not shown). The body is also shown with a pressurized fluid flush-out port 60 and associated valve means 62 whereby pressurized water or other flushing fluid is introduced through conduit 61 to flush the accumulated oversize and agglomerated particles from the body 10 through oversize outlet port 50. Valved vent 65 is provided to prevent an air block in the system. It can also be used to purge the system and to remove hazardous gases or vapors. Gases, liquids and solids so removed can be neutralized or otherwise treated to render them environmentally acceptable.

In the preferred embodiment, screener body 10 is cylindrical in shape, and can be fabricated from available pipe or tube stock of convenient length. However, any convenient shape such as square or rectilinear can be employed, so long as the screener body retains its rigid shape, is capable of withstanding the necessary pressure and permits the mounting of the filter medium. For the purposes of further describing the invention hereinafter the cylindrical configuration is utilized.

The screener body 10 is provided with access port 12 located in the end of the body opposite, and axially aligned with outlet port 11. Filter medium mounting flange 14, having an inside dimension corresponding to access hole 12, or other suitable mounting means is permanently affixed to the top of the body. Thus, screen assembly 20 can be mounted within screener body 10 through access port 12, resting on filter medium mounting flange 14. While this is a preferred embodiment for ease of cleaning and installation, screen assembly 20 can be permanently affixed to screener body 10.

Screen assembly 20 is mounted within screener body 10 coaxially with outlet port 11 such that only slurry which has passed through the filter screen medium can flow out the outlet port. Screen assembly 20 is retained in the proper position and alignment about outlet port 11 by retaining ring 95 which is affixed to the interior surface of body 10 about outlet port 11. When a fine mesh is used in the screen filter medium, suitable sealing means can be used between retaining ring 95 and the bottom of the screen assembly 20 to prevent the flow of unfiltered slurry through outlet port 11. Screen assembly 20 can be mounted coaxially with screener body 10, but in the preferred embodiment screen assembly 20 is mounted offset from the center of screener body 10 to provide a large annular space for agglomerates which fall to the bottom of the screener body.

In the preferred embodiment, screen assembly 20 is cylindrical with open ends. However, as will be appreciated by one skilled in the art, any convenient shape can be employed as long as the screen assembly (a) is capable of withstanding the necessary pressure; (b) retains its rigid shape; (c) permits acceptably sized particles to pass through; (d) is readily mountable within the body between inlet port 15 and outlet port 11 so that only screened slurry passes through outlet port 11; and (e) admits the backwasher spray head assembly. For the purposes of further describing the invention the cylindrical configuration is utilized.

The filter screen medium can comprise any material capable of separating oversize particles and agglomerates of particles from a slurry. Thus, the filter screen material can be a woven metal wire screen material, a so-called "well screen" of wedge-shape wire in a spiral configuration, or other suitable materials. However, screen assembly 20 must be sufficiently rigid to withstand any pressure drop developed during the screening process. Thus, the filter screen medium can be self-supporting or can be supported by a screen-supporting structure. The material of which the screen medium is made, and the size mesh utilized if the screen medium is a woven metal wire screen, will determine whether a screen-supporting structure is required.

With reference to FIGS. 2 and 2A, there is shown one embodiment of a screen assembly comprising a screen-supporting structure for rigidly supporting the screen medium within the screener body. The supporting structure comprises a plurality of hoops 80, affixed to internal spacers 82, as by welding, so that the hoops are maintained in a superposed, spaced relationship; strap 75 is affixed to the outside of hoops 80, and filter screen medium 25 is affixed to strap 75. To the bottom of strap 75 is welded bottom supporting band 90 which is adapted to permit screen assembly 20 to be mounted within retaining ring 95 in screener body 10. To the top of strap 75 is welded flanged top supporting band 85 with mounting flange 14.

Screener body 10, as shown in FIG. 1, is closed by flanged cover plate 18 comprising flanged mounting port 16 coaxial with and of a diameter larger than the screen assembly. Mounted on flanged port 16 is isolation valve 35, or other sealing means suitable for isolating the backwasher means 30 from the screener body. Retractable backwasher means 30 is mounted on isolation valve 35, and comprises a spray head 32 and a fluid delivery tube 34 as described, for example, in U.S. Pat. No. 4,082,057 issued on Apr. 4, 1978 to Tom. F. Hayes, the disclosure of which is herein incorporated in its entirety by reference. Spray head 32 preferably has fluid outlets arranged about its circumference to provide a spray in a 360° pattern about the longitudinal axis of the delivery tube. Valve means 35 is assembled by conventional means on the upper surface of flanged port 16. In the preferred embodiment, valve means 35 is a ball valve which, in the open position, provides a passage of the same diameter as the inside diameter of flange port 16. It is necessary that valve 35, while in the open position, provide a direct-line passage for the backwasher assembly. It is possible to use a gate or other type of valve so long as the closure means is completely withdrawn from the valve passage when the valve is in the open position.

During clean-out the backwashing fluid can be permitted to flow through outlet port 11; or by closing valve 2 and opening valve 52 the backwashing fluid can be kept separated from the slurry. Depending on the further process requirements, the backwashing fluid can be the same as the slurry fluid or can be any other fluid which is compatible with the slurry fluid.

It is preferred that screener body 10 be equipped with a deflection baffle 40 to prevent the eventual erosion of screen assembly 20 by the incoming slurry stream. A visual inspection port 45 can be provided near inlet port 15 to permit the monitoring of the condition of the filter screen medium, and to determine whether it needs to be backwashed. An additional port 46 can be provided adjacent oversize outlet port 50 to facilitate visual inspection and cleanout of the screener body. These inspection ports can be fabricated from chemically resistant glass or transparent plastics and provided with gaskets and sealing means to prevent leakage under the pressure conditions for which the system is designed.

With specific reference to the embodiment shown in FIG. 1, the in-line wet screening apparatus of the present invention operates as follows. Slurry is carried to the wet screening apparatus by upstream slurry conduit 1 and is introduced through inlet port 15 in the screener body 10 to an annular space between the body and screen assembly 20. The slurry flows through screen assembly 20 from the outside to the inside and the filtered slurry flows out through outlet port 11. It is then carried for further processing by downstream slurry conduit 3. Oversized particles or agglomerates of particles are retained in the annular space on the outside of the screen assembly. When the quantity of particles so accumulated begins to impede the flow of slurry through the screen medium, or sooner if preferred, the flow of slurry is stopped by closing inlet port valve 17 and the screened slurry is allowed to drain out of the body through outlet port 11. The backwasher isolation valve 35 is opened, the backwashing fluid is turned on and the washer 30 is passed down through the inside of the screen assembly 20. Spray head 32 emits pressurized backwashing fluid over substantially the entire area of the inner surface of the screen assembly, thereby dislodging oversized and agglomerated particles from the outside of the screen medium into the annular space between the body and the screen medium. This backwashing is accomplished by a high pressure stream of fluid emanating from spray head 32 which moves close to the screen medium, thereby effecting a positive and complete cleaning. Oversized and agglomerated particles are washed from the body through oversize outlet port 50. Valve 52 is opened, and valve 2 can be closed if it is desired to remove the backwashing fluid with the oversized material during the backwashing step. They are then transported to suitable collection means (not shown) by oversize particle conduit 4. The washer is then retracted and again isolated by closing valve 35. Any agglomerates or oversize particles remaining in the bottom of the screener body can be flushed out by opening flushing valve 62 to admit water or other pressurized fluid from source 61 through flushing port 60. If the flushing fluid is to be permitted to flow out through outlet port 11, it is preferable to use a flushing fluid which is the same as, or compatible with the slurry fluid. Alternatively, valve 2 can be closed and all flushing fluid will be discharged through port 50. After the screener has been completely cleaned and valves 35 and 52 are closed, the flow of slurry through the screener is resumed. Once valve 35 is closed, the backwasher assembly is securely protected from contamination or encrustation by the slurry admitted to the screener.

The same general sequence of steps described above is followed in the operation of the embodiment of the invention shown in FIG. 3 where the wet screening apparatus is mounted at an angle acute to the horizontal with inlet port 15 and oversize outlet port 50 placed on opposite sides of screener body 10. Mounting screener body 10 at a slight angle as shown facilitates cleaning and washout of oversize particles. As will be obvious to one of reasonable skill in the art, the apparatus can be mounted horizontally, or at any angle required by the special limitations or conduit configurations of the system with which the in-line screening apparatus is to be employed. Thus, in addition to the specific and preferred configurations shown in FIGS. 1 and 3, the apparatus can be installed in a vertical position and constructed so that the incoming slurry, the backwasher spray means and the oversize particle outlet are all at the lowermost end of the apparatus, and the screened slurry leaves through an outlet port located at the uppermost end of the apparatus. The screening device of this invention can be made adaptable to existing conduits as by providing mating flanges or other connecting means, so the device can be inserted in any existing process streams requiring an in-line wet screening step.

The components of the device are preferably fabricated from materials which are both physically and chemically resistant to the slurry components, i.e., carbon steel, stainless steel, plastic, a Teflon-lined material, or the like. The principal metal parts of the assembly including especially the screener body and the screen assembly, where a metal screen is used as the filter medium, are preferably fabricated from stainless steel to prevent rusting, pitting and corrosion of the interior surfaces of the apparatus which come in contact with the slurry. The mesh of the screen will be determined by the nature of the slurry to be screened and the size of the particles which are to pass through for further processing. A suitable embodiment useful for filtering a PVC slurry utilizes a cylindrical stainless steel screen having an outside diameter in excess of 12 inches, 3 mesh 0.054"SS wire having square openings greater than 0.25 inches installed over perforated plate or expanded metal with 70% open screen area, mounted within a cylindrical stainless steel screener body having an outside diameter in excess of about 20 inches. The overall size of the screener apparatus, especially the screener body and screen assembly can range from a few inches up to ten feet, or larger, to accommodate the capacity and throughput requirements of the process stream in which the apparatus is utilized.

It will be appreciated by those familiar with the art that the cleaning cycle can be made completely automatic and controlled by conventional electronic apparatus and electro-mechanical valve operating and control means. For example, inlet port valve 17 and washer isolation valve 35 can be fitted and wired through appropriate circuitry to electro-mechanical valve opening devices. When it is desired to activate the backwasher apparatus, an electronic signal can be transmitted to electro-mechanical means which close valves 17 and 2, thereafter activate means which open valves 35 and 52, cause the washer to pass through the filter medium to the bottom of the screener body and then retract. Since all of the valves and controls can be readily programmed to function in accordance with a predetermined timing cycle, it is possible to completely automate the filtering and cleaning operation. Alternatively, it is possible to place a pressure sensing device in the filtered slurry effluent stream within the screener body or in an upstream conduit which is capable of triggering an alarm, or initiating the cleaning cycle when a predetermined change in pressure is detected.

It will be appreciated that while the above description has been specifically directed to in-line wet screening of a PVC slurry, the methods and apparatus disclosed are readily adapted for use in any instance where it is desired to remove agglomerated particles and particles above a certain size from a fluid suspension including particles carried in liquid or gas streams. For instance, the invention in any of its embodiments has obvious advantages and utility in removing large chunks from coal slurries and slurries used by the iron and zinc mining industries to transport solid ore bearing materials, and especially where the materials are hazardous such as radioactive ores or wastes.

What I claim is:

1. A pressurized in-line wet screening apparatus for separating oversize particles from a fluid slurry comprising:

a rigid, hollow body member capable of withstanding the pressure of the fluid slurry, the body member having a valved slurry inlet port and a slurry outlet port, each port adapted to mate with slurry conduit means;

a washer access port opposite from the slurry outlet port;

a hollow, open-ended screen assembly fixedly mounted within the body member between the slurry outlet port and the washer access port and in axial alignment with the washer access port;

a valved oversize particle discharge port at the lowermost end of the body member adapted to mate with oversize particle conduit means; and retractable backwasher means externally mounted on the body member in axial alignment with the washer access port and the screen assembly, where the backwasher means comprises a fluid discharging spray head adapted to pass from a retracted position outside of the body member, through the washer access port and axially through the interior of the screen assembly during backwashing to dislodge and wash out accumulated oversize particles, and then to withdraw to its retracted position.

2. The apparatus of claim 1 in which the screen assembly is cylindrical in shape.

3. The apparatus of claim 1 which further includes valve means rigidly mounted between the washer access port and the backwasher means.

4. The apparatus of claim 1 which further comprises a valved pressurized fluid flush-out port opposite and at the same end of the body member as the oversize particle discharge port, whereby pressurized, auxilliary flushing fluid is admitted to wash out accumulated, oversize particles.

5. The apparatus of claim 1 in which the axial alignment of the screen assembly is vertical.

6. The apparatus of claim 1 in which the screen assembly comprises a woven metal wire screen material.

7. The apparatus of claim 1 in which the screen assembly comprises a rigid filter medium of wedge-shape wire construction.

8. The apparatus of claim 1 in which the body member and the screen assembly are cylindrical in shape and the screen assembly comprises a woven metal wire screen material.

9. The apparatus of claim 8 in which the screen assembly is mounted radially offset from the longitudinal axis of the body member.

* * * * *